United States Patent
Bechtel et al.

(10) Patent No.: US 9,041,838 B2
(45) Date of Patent: May 26, 2015

(54) HIGH DYNAMIC RANGE IMAGER SYSTEM

(71) Applicant: Gentex Corporation, Zeeland, MI (US)

(72) Inventors: Jon H. Bechtel, Holland, MI (US);
Gregory S. Bush, Caledonia, MI (US);
Daniel G. McMillan, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 35 days.

(21) Appl. No.: 13/766,867

(22) Filed: Feb. 14, 2013

(65) Prior Publication Data

US 2013/0208157 A1    Aug. 15, 2013

Related U.S. Application Data

(60) Provisional application No. 61/598,512, filed on Feb. 14, 2012.

(51) Int. Cl.
| | | |
|---|---|---|
| H04N 3/14 | (2006.01) | |
| H04N 5/235 | (2006.01) | |
| H04N 5/355 | (2011.01) | |

(52) U.S. Cl.
CPC ............. *H04N 5/235* (2013.01); *H04N 5/3559* (2013.01)

(58) Field of Classification Search
CPC . H04N 5/2355; H04N 5/378; H04N 5/35545; H04N 5/3532; H04N 5/235
USPC .......... 348/294–302, 320, 322, 314, 362, 308
See application file for complete search history.

(56) References Cited

U.S. PATENT DOCUMENTS

| | | | |
|---|---|---|---|
| 4,630,307 A | 12/1986 | Cok | |
| 5,027,148 A | 6/1991 | Anagnostopoulos | |
| 5,105,264 A | 4/1992 | Erhardt | |
| 5,288,988 A | 2/1994 | Hashimoto et al. | |
| 5,469,377 A | 11/1995 | Amano | |
| 5,717,791 A | 2/1998 | Labaere et al. | |

(Continued)

FOREIGN PATENT DOCUMENTS

| | | |
|---|---|---|
| JP | 10-051693 | 2/1998 |
| JP | 2000048183 | 2/2000 |

(Continued)

OTHER PUBLICATIONS

Patent Cooperation Treaty, International Searching Authority, International Search Report, Written Opinion of the International Searching Authority, May 16, 2013, 7 pages.

(Continued)

*Primary Examiner* — Ahmed A Berhan
(74) *Attorney, Agent, or Firm* — Price Heneveld LLP; Scott P. Ryan

(57) ABSTRACT

An imaging system configured to capture an image is provided, the imaging system including a high dynamic range imager configured to capture at least one high dynamic range image, and circuitry, wherein scheduling tasks within a row time interval is arranged to permit sharing of circuits used for correlated double sampling with selective reset tasks and with pixel readout tasks, and wherein scheduling tasks within a row time interval is arranged to permit sharing of comparator with selective reset tasks and with pixel readout tasks, while also providing at least one selectable integration period for which the integration period is adjustable and set to substantially less than a row time interval.

10 Claims, 5 Drawing Sheets

(56) References Cited

U.S. PATENT DOCUMENTS

| | | | |
|---|---|---|---|
| 5,748,303 A | 5/1998 | Davis et al. |
| 5,805,217 A | 9/1998 | Lu et al. |
| 5,892,541 A | 4/1999 | Merrill |
| 5,909,244 A | 6/1999 | Waxman et al. |
| 6,091,862 A | 7/2000 | Okisu |
| 6,175,383 B1 | 1/2001 | Yadid-Pecht |
| 6,229,578 B1 | 5/2001 | Acharya et al. |
| 6,369,737 B1 | 4/2002 | Yang et al. |
| 6,396,505 B1 | 5/2002 | Lui et al. |
| 6,429,594 B1 | 8/2002 | Stam et al. |
| 6,466,333 B1 | 10/2002 | Schoolcraft et al. |
| 6,552,747 B1 | 4/2003 | Hasegawa |
| 6,570,616 B1 | 5/2003 | Chen |
| 6,580,454 B1 | 6/2003 | Perner et al. |
| 6,606,121 B1 | 8/2003 | Bohm et al. |
| 6,628,330 B1 | 9/2003 | Lin |
| 6,714,239 B2 | 3/2004 | Guidash |
| 6,744,916 B1 | 6/2004 | Takahashi |
| 6,765,619 B1 | 7/2004 | Deng et al. |
| 6,774,988 B2 | 8/2004 | Stam et al. |
| 6,791,609 B2 | 9/2004 | Yamauchi et al. |
| 6,831,689 B2 | 12/2004 | Yadid-Pecht |
| 6,873,360 B1 | 3/2005 | Kawashiri |
| 6,928,196 B1 | 8/2005 | Bradley et al. |
| 6,933,971 B2 | 8/2005 | Bezryadin |
| 6,963,369 B1 | 11/2005 | Olding |
| 6,963,370 B2 | 11/2005 | DiCarlo et al. |
| 6,975,355 B1 | 12/2005 | Yang et al. |
| 6,977,685 B1 | 12/2005 | Acosta-Serafini et al. |
| 6,993,200 B2 | 1/2006 | Tastl et al. |
| 7,010,174 B2 | 3/2006 | Kang et al. |
| 7,079,178 B2 | 7/2006 | Hynecek |
| 7,103,260 B1 | 9/2006 | Hinson |
| 7,142,240 B1 | 11/2006 | Hua et al. |
| 7,142,723 B2 | 11/2006 | Kang et al. |
| 7,146,059 B1 | 12/2006 | Durrand et al. |
| 7,149,369 B2 | 12/2006 | Atkins |
| 7,202,463 B1 | 4/2007 | Cox |
| 7,239,757 B2 | 7/2007 | Kang et al. |
| 7,244,921 B2 * | 7/2007 | Mabuchi ..................... 250/208.1 |
| 7,292,725 B2 | 11/2007 | Chen et al. |
| 7,305,144 B2 | 12/2007 | Fattal et al. |
| 7,317,843 B2 | 1/2008 | Sun et al. |
| 7,362,355 B1 | 4/2008 | Yang et al. |
| 7,362,897 B2 | 4/2008 | Ishiga |
| 7,376,288 B2 | 5/2008 | Huang et al. |
| 7,408,136 B2 | 8/2008 | Bechtel et al. |
| 7,454,136 B2 | 11/2008 | Raskar et al. |
| 7,468,750 B2 | 12/2008 | Mabuchi et al. |
| 7,483,486 B2 | 1/2009 | Mantiuk et al. |
| 7,489,352 B2 | 2/2009 | Nakamura |
| 7,492,375 B2 | 2/2009 | Toyama et al. |
| 7,502,505 B2 | 3/2009 | Malvar et al. |
| 7,519,907 B2 | 4/2009 | Cohen et al. |
| 7,567,291 B2 | 7/2009 | Bechtel et al. |
| 7,598,998 B2 | 10/2009 | Cernasov et al. |
| 7,653,240 B1 | 1/2010 | Otobe et al. |
| 7,663,631 B1 | 2/2010 | Friedman et al. |
| 7,675,559 B2 | 3/2010 | Kishi et al. |
| 7,714,900 B2 | 5/2010 | Chiu |
| 7,783,121 B1 | 8/2010 | Cox |
| 7,859,565 B2 | 12/2010 | Schofield et al. |
| 7,876,926 B2 | 1/2011 | Schwartz et al. |
| 7,876,957 B2 | 1/2011 | Ovsiannikov et al. |
| 7,881,496 B2 | 2/2011 | Camilleri et al. |
| 7,881,497 B2 | 2/2011 | Ganguli et al. |
| 7,881,839 B2 | 2/2011 | Stam et al. |
| 7,881,848 B2 | 2/2011 | Hayakawa et al. |
| 7,885,766 B2 | 2/2011 | Sugimoto et al. |
| 7,889,887 B2 | 2/2011 | Azuma |
| 7,889,949 B2 | 2/2011 | Cohen et al. |
| 7,890,231 B2 | 2/2011 | Saito et al. |
| 7,898,182 B2 | 3/2011 | Futamura |
| 7,898,400 B2 | 3/2011 | Hadi et al. |
| 7,899,213 B2 | 3/2011 | Otsuka et al. |
| 7,903,841 B2 | 3/2011 | Smilansky |
| 7,903,843 B2 | 3/2011 | Sawaki et al. |
| 7,904,247 B2 | 3/2011 | Nakamori |
| 7,911,512 B2 | 3/2011 | Henderson |
| 7,948,543 B2 | 5/2011 | Watanabe |
| 7,964,835 B2 | 6/2011 | Olsen et al. |
| 8,115,841 B2 * | 2/2012 | Solhusvik ..................... 348/294 |
| 8,196,839 B2 | 6/2012 | Wang |
| 8,421,889 B2 | 4/2013 | Hiyama et al. |
| 2002/0186309 A1 | 12/2002 | Keshet et al. |
| 2003/0001080 A1 | 1/2003 | Kummaraguntla et al. |
| 2003/0011708 A1 | 1/2003 | Kawamura |
| 2003/0058346 A1 | 3/2003 | Bechtel et al. |
| 2003/0218621 A1 | 11/2003 | Jiang |
| 2003/0231252 A1 | 12/2003 | Findlater et al. |
| 2004/0021058 A1 | 2/2004 | Drowley et al. |
| 2004/0096124 A1 | 5/2004 | Nakamura |
| 2004/0161145 A1 | 8/2004 | Embler |
| 2004/0239790 A1 | 12/2004 | Maeda et al. |
| 2005/0068441 A1 | 3/2005 | Parks |
| 2005/0135700 A1 | 6/2005 | Anderson |
| 2005/0141047 A1 | 6/2005 | Watanabe |
| 2005/0174452 A1 | 8/2005 | Van Blerkom et al. |
| 2005/0200733 A1 | 9/2005 | Malvar |
| 2005/0270391 A1 | 12/2005 | Watanabe |
| 2006/0011810 A1 | 1/2006 | Ando et al. |
| 2006/0044413 A1 * | 3/2006 | Krymski ..................... 348/230.1 |
| 2006/0104505 A1 | 5/2006 | Chen et al. |
| 2006/0139470 A1 | 6/2006 | McGowan |
| 2006/0176380 A1 | 8/2006 | Kobayashi et al. |
| 2006/0181625 A1 | 8/2006 | Han et al. |
| 2006/0215882 A1 | 9/2006 | Ando et al. |
| 2007/0002154 A1 | 1/2007 | Kang et al. |
| 2007/0013807 A1 | 1/2007 | Kanai et al. |
| 2007/0040100 A1 | 2/2007 | Zarnowski et al. |
| 2007/0110300 A1 | 5/2007 | Chang et al. |
| 2007/0132867 A1 | 6/2007 | Rhee et al. |
| 2007/0257998 A1 | 11/2007 | Inoue |
| 2007/0279500 A1 | 12/2007 | Castorina et al. |
| 2007/0285432 A1 | 12/2007 | Stewart |
| 2008/0001065 A1 | 1/2008 | Ackland |
| 2008/0046150 A1 | 2/2008 | Breed |
| 2008/0055441 A1 | 3/2008 | Altice |
| 2008/0068520 A1 | 3/2008 | Minikey, Jr. et al. |
| 2008/0136953 A1 | 6/2008 | Barnea et al. |
| 2008/0192132 A1 | 8/2008 | Bechtel et al. |
| 2008/0192819 A1 | 8/2008 | Ward et al. |
| 2008/0198246 A1 | 8/2008 | Gardner |
| 2008/0211940 A1 | 9/2008 | Hynecek |
| 2008/0218614 A1 | 9/2008 | Joshi et al. |
| 2008/0278602 A1 | 11/2008 | Otsu |
| 2008/0291309 A1 | 11/2008 | Gruev et al. |
| 2008/0316347 A1 | 12/2008 | Gamal et al. |
| 2009/0046189 A1 | 2/2009 | Yin et al. |
| 2009/0091645 A1 | 4/2009 | Trimeche et al. |
| 2009/0092284 A1 | 4/2009 | Breed et al. |
| 2009/0160987 A1 | 6/2009 | Bechtel et al. |
| 2009/0180015 A1 | 7/2009 | Nakamura |
| 2009/0190015 A1 | 7/2009 | Bechtel et al. |
| 2009/0190019 A1 | 7/2009 | O |
| 2009/0244333 A1 | 10/2009 | Lukac |
| 2009/0256938 A1 * | 10/2009 | Bechtel et al. ................ 348/302 |
| 2010/0061625 A1 | 3/2010 | Lukac |
| 2010/0128159 A1 | 5/2010 | Yamashita |
| 2010/0177203 A1 | 7/2010 | Lin |
| 2010/0187407 A1 | 7/2010 | Bechtel et al. |
| 2010/0188540 A1 | 7/2010 | Bechtel et al. |
| 2010/0231745 A1 | 9/2010 | Li et al. |
| 2010/0295965 A1 | 11/2010 | Davidovici |
| 2010/0302384 A1 | 12/2010 | Sawada et al. |
| 2011/0285849 A1 | 11/2011 | Schofield et al. |
| 2011/0285982 A1 | 11/2011 | Breed |
| 2012/0053795 A1 | 3/2012 | Bos et al. |

FOREIGN PATENT DOCUMENTS

| | | |
|---|---|---|
| JP | 2005-160044 | 6/2005 |
| JP | 2008-092052 | 4/2008 |
| WO | WO9001844 | 2/1990 |

(56) References Cited

FOREIGN PATENT DOCUMENTS

| WO | WO0109717 | 2/2001 |
|---|---|---|
| WO | WO03066432 | 8/2003 |
| WO | WO2009141590 | 11/2009 |

OTHER PUBLICATIONS

Sung-Hyun Yang & Kyoung-Rok Cho, High Dynamic Range CMOS Image Sensor with Conditional Reset, IEEE 2002 Custom Integrated Circuits Conf pp. 265-268, Cheongju Chungbuk, Korea.

C.Tomasi & R. Manduchi, Bilateral Filtering for Gray and Color Images, Proceedings of the 1998 IEEE International Conference on Computer Vision, Bombay, India.

"New Edge-Directed Interpolation," Xin Li et al, IEEE Transactions on Image Processing. vol. 10. No. 10. Oct. 2001 1521-1527.

"Demosaicing: Image Reconstruction from Color CCD Samples, " Ron Kimmel, IEEE Transactions on Image Processing. vol. 8. No. 9. Sep. 1999, pp. 1221-1228.

European Patent Office, Supplementary European Search Report, Mar. 31, 2015 (7 pages).

* cited by examiner

HIGH DYNAMIC RANGE IMAGER SYSTEM

CROSS-REFERENCE TO RELATED APPLICATION

This application claims the priority benefit of U.S. Provisional Patent Application No. 61/598,512 entitled "HIGH DYNAMIC RANGE IMAGER SYSTEM," filed on Feb. 14, 2012, by Jon H. Bechtel et al., the entire disclosure of which is incorporated herein by reference.

FIELD OF THE INVENTION

The present invention generally relates to an imager system, and more particularly, a high dynamic range imager system.

BACKGROUND OF THE INVENTION

High dynamic range imagers, including CMOS and CCD versions, are used in various environments.

SUMMARY OF THE INVENTION

According on one aspect of the present invention, a high dynamic range imaging system configured to capture a high dynamic range image includes an image sensor having an array of pixels, and circuitry in electrical communication with each pixel of the array of pixels, the circuitry having a column-parallel signal processing circuit, wherein the column-parallel signal processing circuit is configured to address an analog pixel value of a pixel of the array of pixels and determine when to selectively initiate a new integration period for the pixel.

According to another aspect of the present invention, a high dynamic range imaging system configured to capture a high dynamic range image includes an image sensor having an array of pixels, and circuitry in electrical communication with each pixel of said array of pixels, wherein the circuitry is configured to independently select one integration period from a set of available integrations periods for substantially each pixel of the array of pixels, wherein the circuitry is further configured to conditionally reset a pixel of the array of pixels when a longest available integration period is not selected, wherein said circuitry is further configured to substantially sequentially readout pixels of the array of pixels, and wherein the circuitry is further configured to perform the conditional reset during a blanking period of the readout.

According to yet another aspect of the present invention, an imaging system configured to capture an image includes a high dynamic range imager configured to capture at least one high dynamic range image, and circuitry configured to schedule tasks within a row time interval to permit sharing of circuits used for correlated double sampling between selective reset tasks and pixel readout tasks while also providing at least one selectable integration period for which the integration period is adjustable and set to substantially less than a row time interval.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION

Figure 1:
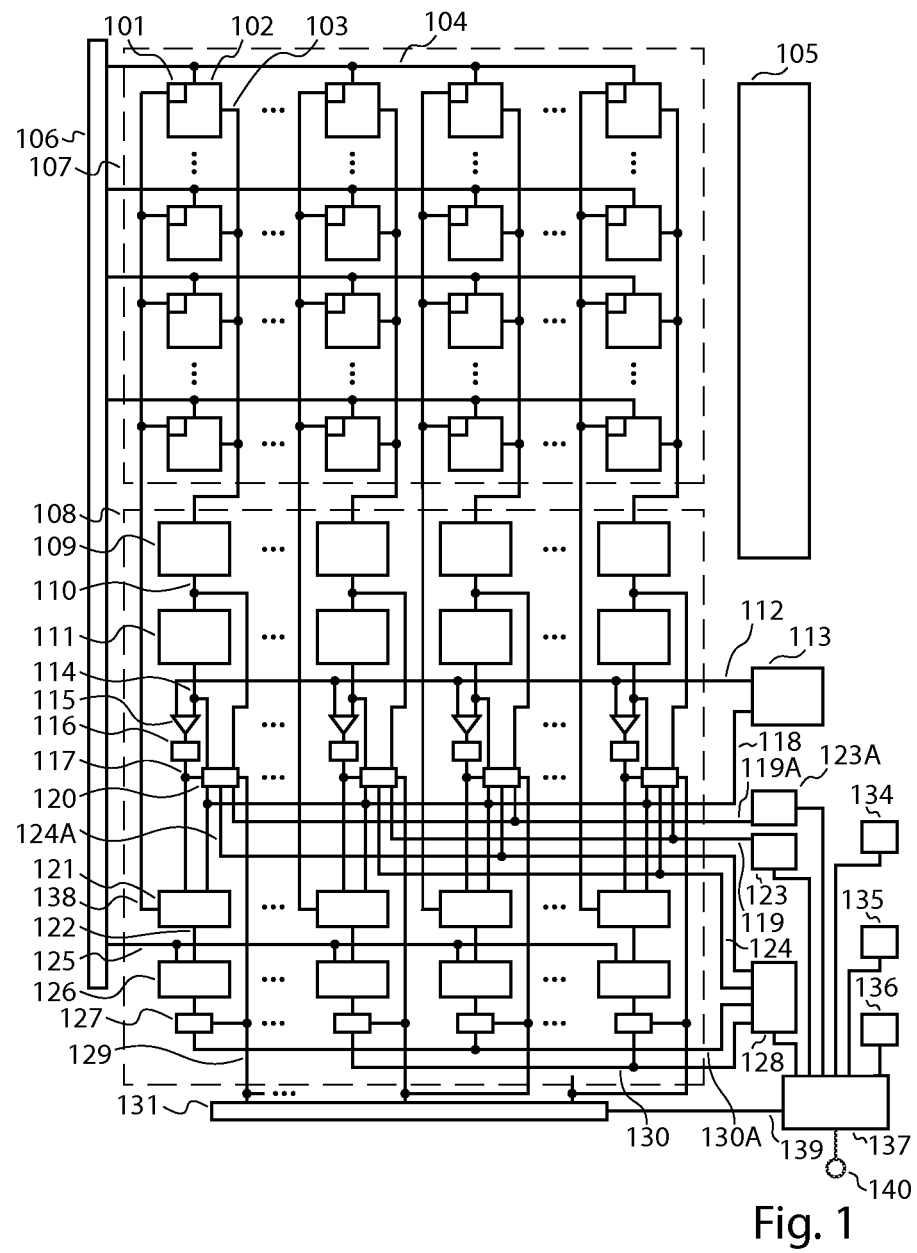
FIG. 1 is a diagram of a high dynamic range imager device, in accordance with one embodiment of the present invention.

The present illustrated embodiments reside primarily in combinations of method steps and apparatus components related to a high dynamic range imager. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The high dynamic range imager described here is based on a 4 T pixel structure and utilizes selectable integration periods with sequencing of tasks based on a rolling shutter sequence. A key advantage of the 4 T based pixel structure is that the readout node is separate from the pixel structure where integrated light induced charge is collected so that to take a pixel reading, at the end of the integration period, the readout node is reset, a reference reading of the reset voltage is taken, the pixel charge is gated to the readout node, a signal reading is taken and finally the reference reading is subtracted from the signal reading. This is properly called "correlated" double sampling since the reference reading is obtained using the reset actually used for the readout in progress so that the kTC related reset noise is cancelled in addition to cancellation of other offsets in the readout chain. For the 3 T structure, the truly correlated reset is the one that is performed to start integration for a pixel reading. Because of the difficulty in saving this value through the integration period, the usual practice with the 3 T based pixel structure is to read the pixel value, reset the pixel and then read this next "non-correlated" reset value as the reference reading and subtract it from the pixel reading in a "non-correlated" double sampling operation. This does not cancel the kTC reset noise but still cancels other offsets. Some still refer to this as correlated double sampling but here, the more restricted terminology indicated by the parenthesized terms "correlated" double sampling and "non-correlated" double sampling will be used.

The circuits used for selective reset are similar to ones previously disclosed for the 3 T and 4 T based designs so U.S. Pat. No. 8,289,430, entitled "HIGH DYNAMIC RANGE IMAGING DEVICE," US Patent Application No. 2010/0187407 A1, entitled "IMAGING DEVICE," and U.S. Pat. No. 8,144,223, entitled "IMAGING DEVICE," are hereby incorporated by reference in their entirety, and some of the details will not be repeated here. The charge overflow detection technique as described in U.S. Pat. No. 8,144,223, entitled "IMAGING DEVICE," is preferred for the 4 T based design. For 4 T based designs, selective reset can be performed by provision of the capability to selectively operate the transfer gate of individual pixels to selectively transfer charge from the charge collection site of a pixel selected for reset to the readout node while the readout node for the pixel is held in its reset state to complete reset of the pixel to begin a new integration period. The floating diffusion may be reset for all of the pixels in the row or any subset of these pixels without resetting pixels whose transfer gates are not switched to the conducting state to enable the reset. For the 3 T based designs, selective reset is preferably accomplished by provision of the capability to selectively operate the reset transistor of individual pixels to directly reset the charge on the pixel to its reset level to begin a new integration period.

Configurations included in the prior art designs on which this design is based utilize a rolling shutter readout sequence to provide uniform row processing time intervals to read and digitize pixel values in a row of the image. The regular, repetitive cadence of row processing time intervals is used to structure operation of the imager readout process. The readout process included tasks to initiate and to conditionally reset integration periods for individual pixels to initiate a shorter selectable integration period and finally to read and digitize pixel values. In one prior art design, access to sampled analog pixel values to digitize them was permitted to overlap selective reset operations. Additionally, scheduling of selective reset operations within the row processing time intervals was selected to provide fine adjustment for selectable integration periods so that each selectable integration period could be adjusted to be at or very close to the longest integration period divided by an integral divisor, preferably the integral divisor was further restricted to be very close to an integral power of 2. In an exemplary embodiment of this design, a device that used eight selectable integration periods with the duration each of the three shortest ones being shorter than the row processing time interval was presented. Imaging devices based on the exemplary prior art design were constructed and performed to high standards.

The present invention can continue to utilize selectable integration periods with sequencing of tasks based on a rolling shutter sequence and continues to provide for at least one selectable integration period with a duration that is substantially less than one row time interval. The scheduling of tasks within a row time interval is arranged to permit sharing of circuits used for correlated double sampling by selective reset tasks and for pixel readout tasks while also providing at least one selectable integration period for which the integration period is adjustable and normally set to a duration that is substantially less than a row time interval (8 μs or about ⅕ of the 40 μs row time as an example). In the design, the duration of each of the selectable integration periods is repeatable and the duration of each may be ascertained precisely from the imager rolling shutter repetition rate and the row offset of the initiation of the integration period relative to the row in which it is read in combination with relative placement of reset and readout tasks for the integration period in the row time interval. Furthermore, the duration of each integration period may be adjusted to its approximately desired setting but the flexibility to schedule the selective reset over a wide range of fractional row time settings is restricted so that it is not always possible to provide imager settings that permit the pixel reading of the desired accuracy to be obtained when expressed as the product of the digitized pixel value times an exponent raised to an integral power based on the integration period used for the reading as is done with the prior art imager. Compensation for non-ideal integration period times and for gain variation of per column gain circuits may be provided separately from the imager to offset this limitation, provision is made to optionally provide a scale adjustment factor based on the selected integration period to provide the desired numerical pixel reading based on the integration period that is used. This correction can be combined with others based on the gain of offset correction circuits and/or amplifiers used for a particular reading acquired from a pixel in a particular column and/or to correct for the gain of an analog to digital converter used to digitize a pixel reading from a particular column. This feature is particularly useful when more than one analog to digital converter is used for various imager configurations that employ multiple analog to digital converters. Designs using multiple analog to digital converters may range from ones that use two A/D's to ones that use one A/D per column of pixels in the imager. In one configuration, a double sampling circuit used to subtract an offset from a pixel reading may also affect column gain and a conditionally selectable fixed gain amplifier may also be provided in each column of pixels, such that the compensating adjustments for the gains of each can be based on its use for a specific pixel reading. Additionally, prior art designs that provide selectable integration periods that end at the same time have normally provided ratios of two or four between successive integration periods either limiting dynamic range improvement or necessitating use of a larger number of integration periods that add to processing time or speed requirements to select and initiate the an integration period from the numerous choices. Memory requirements to identify the integration period selected for each pixel are also increased.

FIG. 1 is a simplified diagram of a high dynamic range imaging device that incorporates features of this invention. Pixel array 107 may be of nearly any size. An example is to use 800 rows by 1280 columns of pixels. The imager can utilize a relatively conventional 4 T based pixel design modified to provide a mode in which integration periods may be independently initiated for each pixel. There is no inherent limitation to the imager size and the invention is applicable to a wide range of imager sizes ranging from smaller to much larger pixel counts than the 800×1280 imager size. With shared and substantially non-interfering access to imager row and column circuits for tasks to initiate selectable integration periods and tasks to read rows of pixels and process pixel data and initiate digitization of analog pixel values, there is already sharing of column resources as an option so the upper portion of pixels in a large array may be accessed by column circuits placed above the array and the lower portion of pixels may be accessed by column circuits placed below the array or one set of alternating columns may be accessed by column circuits placed above the array while the other is accessed by column circuits placed below the array. According to one embodiment, the pixel is based on the 4 T design with pixel readout that incorporates correlated double sampling. The imager can utilize a relatively conventional 4 T based pixel design modified to provide a mode in which switching of the pixel transfer gate to its conductive states is enabled by a coincidence of row and column signals so that subsets of pixels in a selected row may be selected for transfer gate operation. The selective transfer gate operation includes setting of the selected transfer gate to a controlled intermediate voltage to create a conduction threshold to detect higher pixel charge levels. With the charge level high enough relative to the transfer gate threshold setting, significant charge will flow to the floating diffusion where it may be detected as a signal to reset the pixel to initiate a shorter integration period. Here the transfer gate enable is used to enable the test for selective reset to provide selective sampling for charge overflow so that charge is not drained from a pixel that is not to be conditionally reset.

In the simplified diagram of FIG. 1, imager control and communication unit 105 can include reception and registering of imager instructions with the capability to shadow imager instructions and the capability to switch between two or more imager instruction sets so that changes may be seamlessly made to imager instruction settings and the settings may be switched back and forth between different instruction sets. The instruction inputs, pixel data outputs, and power supply connections are not indicated in the simplified diagram, nor are many of the internal control connections shown. Row select circuit 106 routes row control signals 104 to the selected row and maintains control signals for other rows in a default, non-active state. For a 4 T based design, these signals are used to select a row of pixels for readout, to control reset signals to reset the floating diffusion and signals to provide the row enable for the row/column "and" function and to control the transfer gate threshold to enable selective switching of the transfer gates to their conductive states and to adjust the conduction threshold of the transfer gate. 3 T based designs are similar except that the reset is of the pixel itself and the "and" function can be applied to selectively switch the reset transistor rather than the transfer gate transistor to its conducting state. Pixel 102 is a representative pixel in the array and the small block 101 represents the "and" function that can be provided with one transistor as detailed in US Patent Application No. 2010/0187407 A1, entitled "IMAGING DEVICE." Column transfer gate enable signal 138 is used instead as a column reset enable signal in the 3 T based design. Column readout signal 103 is used to gate the readout signal from the pixel in the selected row of the corresponding column to its respective column related circuit in column circuit block 108. Column circuit block 108 includes circuits to perform subtraction of a zero reference from the pixel signal in correlated double sampling 109 and the circuit may optionally include gain. An additional gain stage 111, a compare function 115 with latch 116, signal selection and gating circuit 120, column logic control circuit 121 to control the column transfer gate enable signal 138 used for pixel readout and for initiation (conditional or unconditional) of an integration period and control of the input to the memory to monitor and record the index of the currently selected integration period are also included. The column integration period identifying index memory 126 includes a location in which an indication of the index of the currently active integration period for each pixel of the associated column is stored. Gated integration period identifying index latch 127 is used to store the identifying index of the integration period for the pixel that is in the selected row and in its column. When it is selected for readout by column readout select circuit 131, it is gated to integration period identifying index bus 130A for readout. Correlated double sampling circuit 109 can include a pair of sampling capacitors, one to sample a reference value and the other to sample a reading each communicated as column readout signal 103 from the pixel in the selected row. The pixel read mode control circuit 113 asserts a threshold level on the compare input to set the maximum value for the amplified output voltage and a readout mode select logic signal on signal 118 to configure signal selection and gating circuit 120. The analog pixel signal after amplification 114 after it is amplified by amplifier 111 is selected when it is within the output range and the analog pixel signal before amplification 110 is selected otherwise when the latched compare value 117 from comparator 115 indicates that the amplified pixel signal exceeds the acceptable output range indicated by the compare level asserted on signal 117. When column readout select signal 129 is asserted, signal selection and gating circuit 120 gates the selected pixel value to analog to digital converter circuit 123A over analog signal bus 119A and the compare indication to integration period and gain indication register 128 as gain indication signal 124A. The readout mode select logic signal 118 is also routed to column logic control circuit 121 to configure it for the readout mode of operation causing it to assert a transfer gate operation select signal on all of the transfer gate select column signals so that all of the transfer gates in the row are operated by respective transfer gate row commands to perform the readout for all pixels in the selected row. Row select circuit 106 asserts an indication of the selected row on row address bus 125 to address the integration period identifying index for the pixel in the selected row and the associated column and the column logic control circuit 121 signals column integration period identifying tag memory 126 over memory address and control bus 122 to register the integration period identifying index of the pixel in the integration period identifying tag latch 127. A signal on column readout select signal 129 causes the integration period identifying index to be gated to the integration period and gain indication register 128 over the integration period identifying index bus 130A. The range indication for the readout is a composite indication of the selected gain applied to the pixel signal and of the integration period selected for the reading. Three bits are used with the 2 most significant bits set equal to the identifying index of the integration period and the least significant bit is set equal to the indication that the conditionally selectable gain is not used. Assign an integration period identifying index of 0 to the longest selectable integration period, 1 to the next shorter selectable integration period, etc., assigning the highest index to the shortest selectable integration period. Assign 1 to the compare indication that the selectable gain is not used. In FIG. 1 two analog to digital converter circuits 123A and 123 are provided with even numbered columns routed to analog to digital converter circuit 123A as illustrated by the connection of signal selection and gating circuit 120 to analog signal bus 119A that connects to analog to digital converter circuit 123A. Odd numbered columns are connected through analog signal bus 119 to analog to digital converter circuit 123. Synchronization unit 137 provides buffering to synchronize the gain and selected integration period for each pixel with the digitized pixel value for the pixel. Synchronization unit 137 provides synchronization for pixel values received in pairs preferably providing a data stream serialized pixel by pixel for pixel output.

Figure 2:
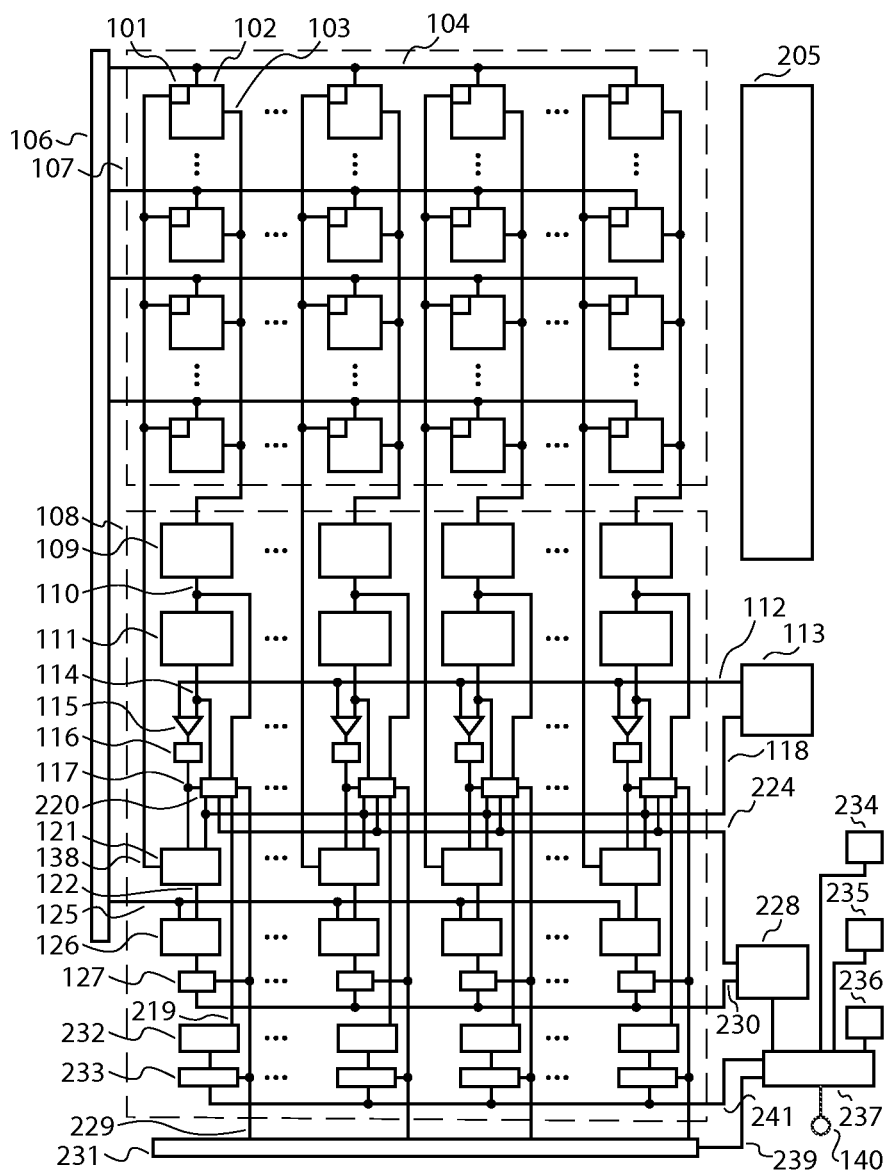
FIG. 2 is a diagram of a high dynamic range imager device, in accordance with one embodiment of the present invention.

FIG. 2 is similar to FIG. 1 except that it is modified to use per column analog to digital converters 232 in place of the pair of analog to digital converters 123 and 123A that are shared by the entire array in FIG. 1. Most of the imager features are very similar to counterparts in FIG. 1 and have been assigned the same number references in FIG. 2. Others are similar but 1xy in FIG. 1 is changed to 2xy in FIG. 2 to indicate similarity with the counterpart in FIG. 1 but with a significant change. Blocks with more extensive changes are assigned new numbers. Imager control and communication unit 205 is modified to accommodate the bus and timing changes introduced to provide per column analog to digital converters 232 that receive and digitize the analog pixel value 219 selected for readout. Signal selection and gating circuit 220 is modified from the corresponding unit of FIG. 1 to transmit the selected analog pixel value 219 without gating since analog paths 219 are provided on a per column basis so multiplexing is not needed and would interfere with timing since the usual intent of providing the per column analog to digital converters is to use a substantial portion of the row read time to perform the conversion. Column readout select circuit 231 is configured to select each column in sequence in place of selection of even/odd column pairs. Gated analog to digital value buffer circuits are provided to buffer the values until they are transmitted on a column by column basis to calibration correction unit 237 over digital pixel value bus 241. When column readout select signal 229 is asserted, indications of the selected gain are gated on gain indication bus 224 and an indication of selected integration period for the pixel is gated on integration period identifying index bus 230. The gain indication bus 224, integration period and gain indication register 228, and integration period timing correction factors 234, double sampling correction factors 235, and gain circuit correction factors 236 serve the same pixel calibration correction functions as indicated for the counterparts in FIG. 1 but are modified to synchronize the digitized pixel value and the indications of gain and integration period selections with the per column analog to digital converter structure.

As will be explained in connection with FIGS. 3 and 4, the imager is read out using a rolling shutter sequence so that an imager frame exposure time is divided by a row clock into a sequence of time periods that equal or exceed the number of imager rows to be read and row readout can be structured so that imager reset operations to begin integration, read analog values in a row, and initiate conversion of values to a digitized form for readout are synchronized with the row clock cadence. The execution of operations or tasks including initiation and conditional initiation of selectable integration periods, row parallel readout, analog processing of pixel values and initiation of analog to digital conversion of pixel values for readout needs to be nested into a sequence with a total time duration that is less than or equal to one row time increment since there are normally pixels to be read from nearly every row allocated in the row time sequence. Selected column address bus 139 communicates an indication of the selected column from column readout select circuit 131 to the calibration correction unit 137 to enable selection of calibration values for devices used to process pixel values from particular columns. When calibration correction unit 137 is implemented externally, the direct link provided by calibration correction unit 137 may be replaced by counting of pixels to determine their locations in a row. Pixel locations are typically available from counts of pixels received after a row blanking signal is de-asserted. This count provides an index into arrays of calibration data. The corrected pixel values are provided at corrected pixel value output 140.

For conditional reset, mode control circuit 113 de-asserts readout mode select signal 118 and outputs from signal selection and gating circuit 120 are disabled or ignored, while the column logic control circuit 121 is switched to control the column circuits used to initiate a new integration period.

With the rapid improvement in imager performance, imager pixel counts have increased, and imager repetitive frame repetition rates have stayed constant or increased so there has been less time to allocate to processing for each row of pixels and even less time to allocate to each pixel since there are more rows allowing less time per row and more pixels per row allowing even a smaller fraction of the smaller row time to allocate to each pixel. At the same time, the ability to acquire better images at lower light levels has progressed steadily and much of the improvement has come from reductions in imager readout noise. Imager readout techniques had migrated toward high speed sampling of every pixel in the array using common pixel readout components. However, analog noise levels increase generally in proportion to the square root of the gain bandwidth product so that reading many more pixels at lower voltages to detect lower light levels with the more sensitive imagers has created problems so there is now a trend toward more parallel signal processing, particularly at the column level. Certain prior art designs of the high dynamic range imager had already provided per column logic to perform the conditional reset and a design utilized eight selectable integration periods with each successively shorter one four times shorter than the next longer selectable integration period. In this prior art design, once pixel values in a row were sampled for readout in a pair of sample and hold capacitors provided for each column, double sampling and amplification were performed sequentially at a high sampling frequency using common circuits.

Four selectable integration periods are provided with each successively shorter selectable period being nominally 16 times shorter than the next longer selectable integration period. Conditional selection of a gain of four to one is provided for each pixel in the row being read and amplified pixel values that are in range are selected to be digitized and an indication of the selection choice is provided. The selective resets are performed in a time period that does not overlap any readout operations—correlated double sampling, selection of an amplified version of the signal, or initiation of digitization of pixel values that are read. The column wise signal and reference value sampling capacitors, the double sampling circuit, and the amplifier used to amplify the pixel value to provide the amplified value for conditional selection and the compare circuit is then used both for pixel readout and for conditional initiation of shorter integration periods. The one of four integration periods selected for readout of each pixel value is identified by using two instead of three bits of memory per pixel and the two bit memory cells fabricated with available memory cell layouts are compact enough to align with the pixel width to provide a compact layout. An additional bit to provide an indication of the use or nonuse of the conditionally selected gain is obtained during readout so memory for this indication does not need to be provided for the array of pixels.

Figure 5:
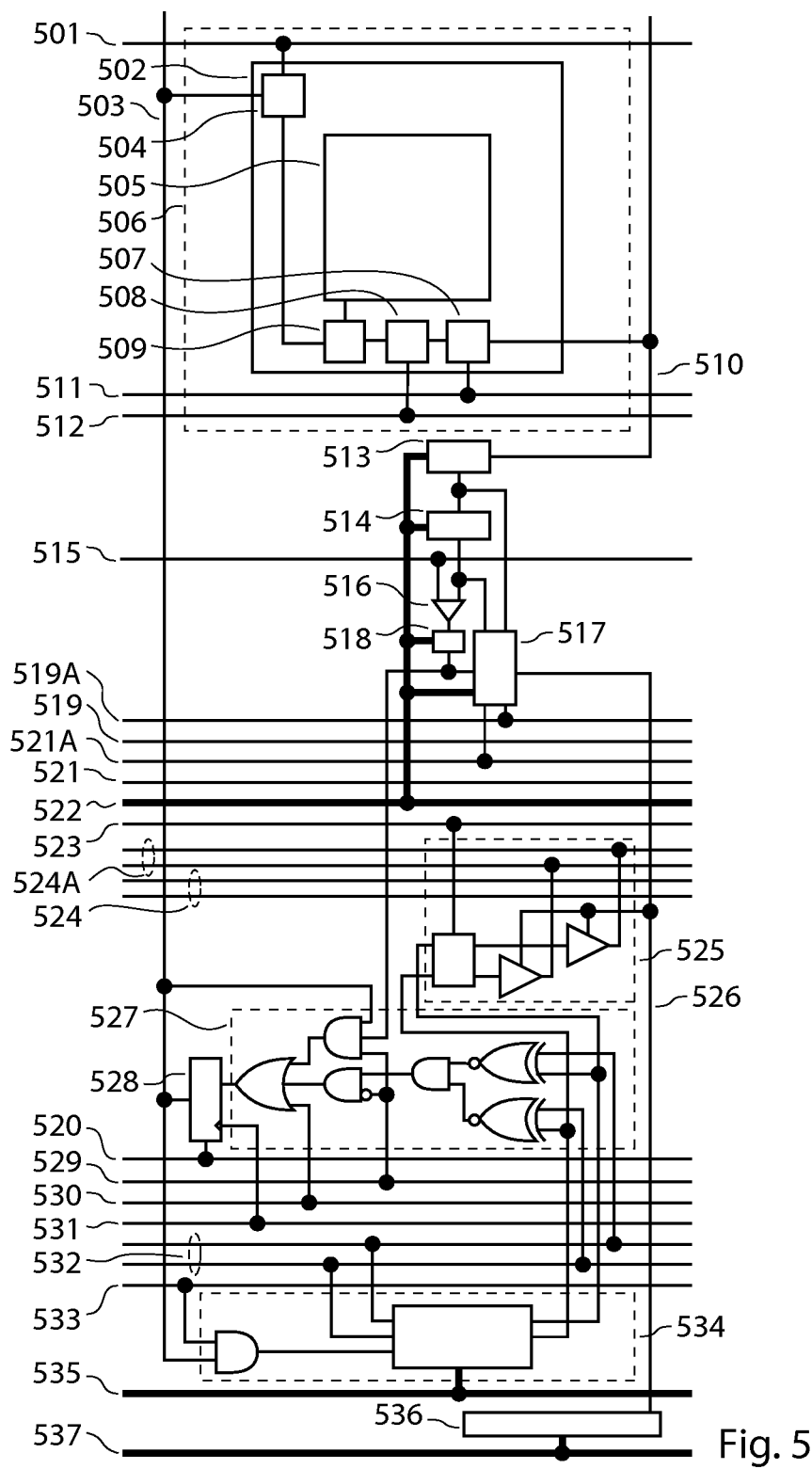
FIG. 5 is a diagram of the column logic that is provided for each active column of the imaging device, in accordance with one embodiment of the present invention.

The 4 selectable integration periods each nominally 16 times shorter than the next longer selectable integration period provide three selectable gain steps, each being approximately 16 to 1. The selectable signal with four to one amplification provides another selectable gain step of 4 to 1 and the 10 bit analog to digital converter provides a resolution of approximately 1024 to 1 so the available incremental digital resolution for the imager in the example exceeds 16 million to one. The device provides a correlated double sampling circuit, a compare circuit, and a selectable gain circuit with an amplifier for each column of pixels. These components are shared for pixel readout and for selective initiation of the integration period for each pixel of the row FIG. 5 is a simplified diagram of the column logic that can be provided for each active column of the imaging device. The column contains one pixel from every row and one representative pixel 506 from the column is depicted in the simplified diagram of FIG. 5. Signal lines that span the width of the diagram continue to neighboring columns and can attach to all of the column circuits of the imager. Individual row transfer gate operation enable and threshold control signals 501, row read enable signals 511, and row floating diffusion reset signals 512 are provided for each row of pixels and enabled to perform tasks for individually selected rows. These signals each connect to one pixel in each column. Individual column transfer gate operation enable signals 503 and column readout signals 510 are provided for each column of pixels and each attach to the dedicated column circuit so all of the column circuits together provide parallel access to the pixels in the row that is selected by the row selection circuit. The result is that parallel access and processing is provided to each pixel of the selected row of pixels. The example depicted in FIG. 5 is configured to use two analog to digital converters, one for even columns and one for odd columns as indicated in FIG. 1. Analog pixel output bus 521A connects to every other column including the one depicted in FIG. 5 and signal select and gating circuit 517 selects the signal of the chosen gain and gates it to analog pixel output bus 521A when column select signal 526 is asserted. An indication of the selected gain is gated to the selected pixel gain indication bus 519A, and an indication of the selected integration period is gated to the selected integration period bus 524A when the column select signal 526 is asserted. The A suffixed signals are connected to the column circuits of even numbered columns and the corresponding signal buses 521, 519, and 524 that pass through the even column circuits without connection are connected to the odd numbered column circuits. With the duplicate signal buses for the sets of even and odd columns, the column select signal 526 can be shared between an even/odd pair of column circuits, thereby transferring pixel analog values and gain and integration period indications for a pair of pixels at one time. Then the column address indication 537 may reference column pairs and column address decoder 536 may serve an even/odd pair of columns.

The circuit in the example of FIG. 5 is based on a 4 T based pixel structure that has provision to set the transfer gate potential level to an intermediate level that will cause it to conduct significantly when the charge on the pixel exceeds a corresponding threshold level. This threshold is set primarily by adjustment of the voltage asserted on row transfer gate operation enable and threshold control signal 501 to a level that will cause charge to flow from light sensing pixel charge accumulation area 505 to floating diffusion and reset transistor 508 when the pixel charge is at a level for which it should be reset. With this setup, if the charge in the pixel charge collection area matches or exceeds the corresponding conduction threshold level a significant amount of charge will flow to the floating diffusion and little or no charge will flow otherwise. The circuit of FIG. 5 is configured to utilize this arrangement to provide a charge overflow detection state for selected pixels whose values match or exceed the threshold level for which reset is to be performed in a selective reset operation. In the event that significant charge overflow does not occur for the pixel that is being conditionally reset, a previously selected integration period that is in progress is continued and, since little or no charge is lost from the pixel under these conditions, the charge overflow detection test has little effect on the final reading. Patent application U.S. Pat. No. 8,144,223, entitled "IMAGING DEVICE," describes application of the charge overflow detection for selective reset to initiate a new integration period. The column circuit of U.S. Pat. No. 8,289,430, entitled "HIGH DYNAMIC RANGE IMAGING DEVICE," and US Patent Application No. 2010/0187407 A1, entitled "IMAGING DEVICE," provide information for one skilled in the art to adapt the circuit of FIG. 5 to apply it to a 3 T based pixel design. The configuration of the logical "and" function performed by block 504 in pixel 506 to provide row/column based pixel selection can be configured according to US Patent Application No. 2010/0187407 A1, entitled "IMAGING DEVICE." In pixel structure 506, the dashed line box of pixel 506 denotes space for row and column connection paths and solid box 502 represents the active pixel structure that contains "and" function 504, light sensing pixel charge accumulation area 505 (The light collection area may cover most of the pixel area when a back illuminated pixel structure is used.), transfer gate 509, floating diffusion and reset transistor 508, and follower amplifier and row select transistors 507.

Correlated double sampling circuit 513, amplifier 514, comparator 516, compare result flip-flop 518, and signal select and gating circuit 517 receive control signals from control bus 522 that provides control and timing signals to sequence operations for these circuits. The analog signal handling circuits 513, 514, and 516 include automatic zero offset correction. Correlated double sampling circuit 513 first receives a reading of the floating diffusion level after reset and then receives a signal reading after charge is transferred to the floating diffusion by operation of the transfer gate and subtracts the reference reading from the signal reading. Amplifier 514 provides a gain of four to one and is operated for a substantial period while the signal is present to provide the needed settling time. Comparator 516 compares the amplified pixel signal from amplifier 514 with compare threshold signal 515 and the compare result is latched or clocked into compare result flip-flop (or latch) 518. Signal select and gating circuit 517 selects the amplified pixel value from amplifier 514 based on the buffered compare signal from compare result flip-flop 518 if it is in range as indicated by indicating a lower pixel response level than compare threshold signal 515 and selects the non-amplified signal from correlated double sampling circuit 513 otherwise. Address decoder 536 decodes the column address indication 537 and asserts the column select signal 526 when the column illustrated in FIG. 5 is addressed. Select signal 526 can be used for an even/odd pair of columns. The assertion of the column select signal 526 causes signal select and gating circuit 517 to gate the selected pixel signal to analog pixel output bus 521A and to gate an indication of the gain used for the pixel value to selected pixel gain indication bus 519A. An indication of the integration period selected to read the pixel value is stored in gated integration period latch 525 when the latch integration period indication signal 523 is asserted and the indication of the selected integration period is gated to the selected integration period bus 524A when the column select signal 526 is asserted.

The column transfer gate operation enable signal 503 is the output of the column transfer gate select flip-flop 528 and is asserted to enable operation of the transfer gate for the pixel in the column when the row transfer gate operation enable and threshold control signal 501 is also asserted and the transfer gate input signal is refreshed to hold the transfer gate in its non-conducting state for all pixels in the column for which the column transfer gate operation enable signal 503 is asserted and row transfer gate operation enable and threshold control signal 501 is in its non-asserted state. These include all pixels of the column for rows that are not selected and may include also the selected row when the row transfer gate operation enable and threshold control signal 501 is not asserted. The transfer gate column enable logic circuit 527 includes an output that serves as the "D" input to the column transfer gate select flip-flop 528. Assertion of the transfer gate select flip-flop reset signal 520 resets the transfer gate select flip-flop 528. Column transfer gate enable clock 531 is asserted to clock the output of the transfer gate column enable logic circuit 527 into column transfer gate select flip-flop 528. The column transfer gate operation enable signal is set unconditionally by asserting the column transfer gate enable clock 531 while the set transfer gate column enable signal 530 is asserted. This is used for unconditional reset operations and for pixel read operations. When the charge overflow detection enable signal 529 is asserted and the set transfer gate column enable signal 530 is not asserted, the column transfer gate select flip-flop 528 is set when it is clocked only if it is already set and the compare output from compare result flip-flop 518 is asserted indicating that charge overflow has occurred. When the charge overflow detection enable signal 529 and the set transfer gate column enable signal 530 are not asserted and the index of the next longer integration period is asserted on the integration period identifying bus 532, the column transfer gate select flip-flop 528 is set when it is clocked only if the currently selected integration period for the pixel matches the index of the next longer selectable integration period for the pixel. This is the same as saying that the pixel was conditionally or unconditionally reset for the next longer integration period. Thus in the setup, the row address of the row selected for a reset or read operation is asserted on row address bus 535 and serves as the memory address for memory 534 to select the integration period identifying index for the pixel selected by the row select from the column of pixels.

For conditional initiation of a selectable integration period for a row, the identifying index of the integration period set for the next longer selectable integration period is asserted on the integration period identifying index bus 532 and the address of the currently selected row is asserted on row address bus 535 so column memory 534 outputs the identifying index of the integration period currently active for pixel 506, and the transfer gate column enable logic circuit 527 compares the identifying index of the pixel with the index of the next longer integration period than the one for the current check. If they are equal, the conditional test for conditional initiation of the next shorter integration period is started by asserting the column transfer gate operation enable signal 503 for this column. Otherwise, the test is bypassed for the pixel and is bypassed for initiation of any remaining conditional integration period until the pixel is read. The first use of the column transfer gate operation enable signal 503 is to set the transfer gate to the charge overflow threshold. Then the charge overflow detection enable signal 529 is asserted and column transfer gate operation enable signal 503 is held in the set state only if the buffered compare value from compare result flip-flop 518 is asserted indicating that charge overflow is detected. Refer to U.S. Pat. No. 8,144,223, entitled "IMAGING DEVICE," that is included herein by reference for a more detailed description.

The column transfer gate operation enable signal 503 is asserted as part of the operation to properly reset a pixel to initiate a selectable integration period and for use of the high dynamic range feature, the identifying index of the currently selected integration period is written into memory whenever a selectable integration period, including the longest is initiated. At the point during or just following reset to begin a new selectable integration period, assertion of column transfer gate operation enable signal 503 is an indicator that a new integration period is being initiated. To record the identifying index of a newly initiated integration period, the index of the newly initiated integration period is asserted on the integration period identifying index bus 532 and the memory write strobe 533 is asserted so the new integration period identifying index is written only if column transfer gate operation enable signal 503 is asserted.

The 4 T based pixel design can be used, but the invention may be implemented based on a 3 T design. Using U.S. Pat. No. 8,289,430, entitled "HIGH DYNAMIC RANGE IMAGING DEVICE," that is included herein by reference and US Patent Application No. 2010/0187407 A1, entitled "IMAGING DEVICE," that is also included herein by reference, one skilled in the art can modify the design of FIG. 5 to adapt it to a 3 T based pixel design. In such a design, the column transfer gate operation enable signal 503 can be replaced by a reset enable signal using the reset transistor configuration taught in US Patent Application No. 2010/0187407 A1, entitled "IMAGING DEVICE." Correlated double sampling is replaced by non-correlated double sampling. In the non-destructive read used to sample a pixel value for conditional reset there is no reset performed to conveniently provide even a non-correlated value for the non-correlated double sampling. Furthermore, the amplifier 514 would likely saturate a pixel value for which conditional reset is preferable. Both problems are mitigated by using a value that approximates the conditional reset threshold as the double sampling reference for the comparison in place of a reset value. The reset value is used for the non-correlated double sampling for readout. A compare threshold may be used in combination with the value used for the double sampling reference to establish a resulting compare threshold while avoiding saturation of the amplifier.

Features of embodiments of this invention can include shared use of one or more column-parallel signal processing circuits for analog pixel value readout and for making a determination of when to selectively initiate a new and shorter integration period for a pixel. The shared components include circuits to perform correlated double sampling, circuits to amplify pixel signal levels, and circuits to compare pixel related signal levels. A second feature is the use of image acquisition based on a rolling shutter sequence wherein selectable integration periods for each pixel of the image span a range from multiple row times to integration periods that are substantially less than a row time in the rolling shutter cadence. FIGS. 3 and 4 illustrate the organization and partitioning of tasks for conditional integration period selection, analog row readout and column parallel analog based processing of pixel values in the row that was read.

Figure 3:
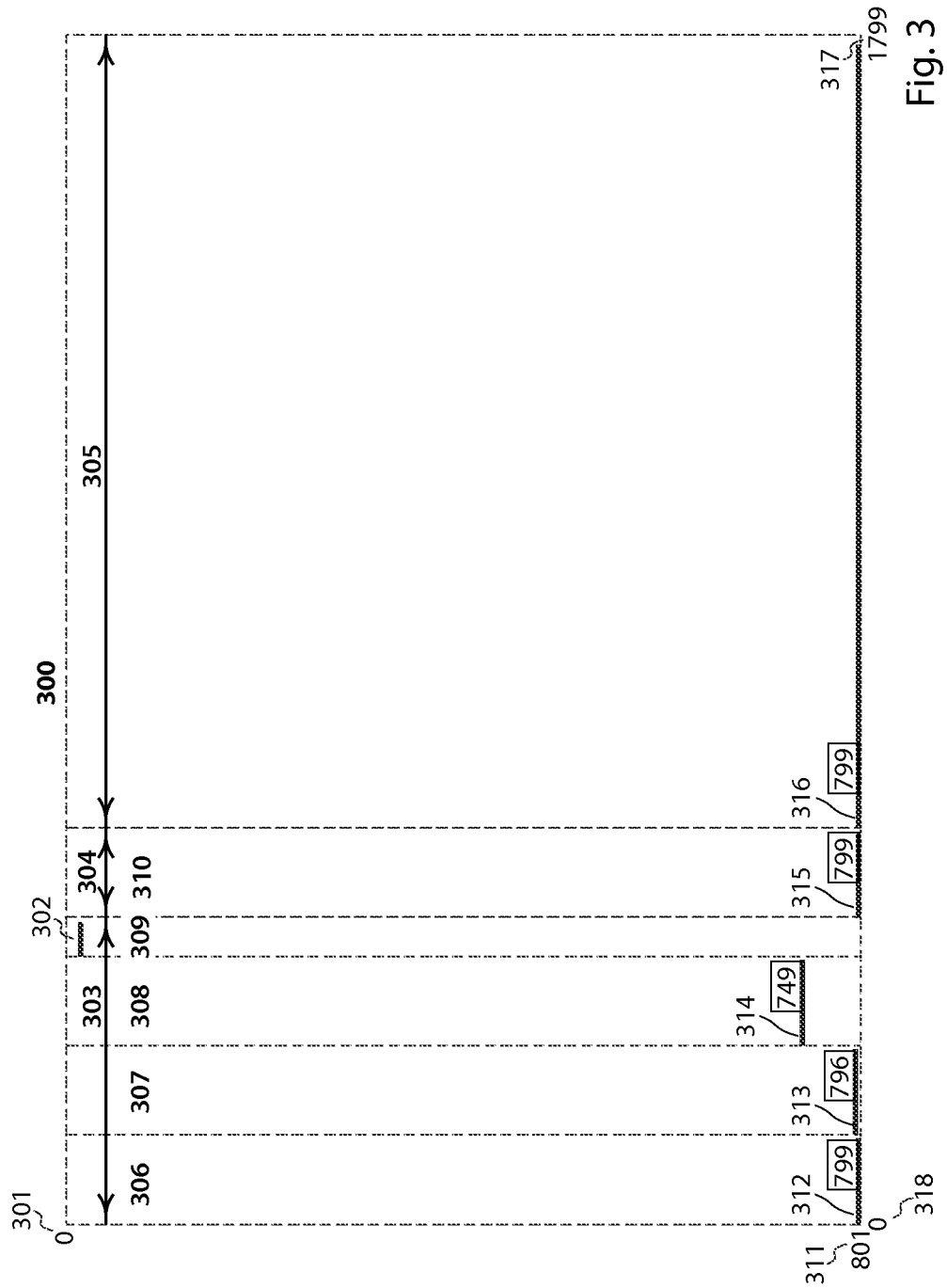
FIG. 3 is a diagram illustrating tasks related to target row, wherein locations within the rolling shutter sequence at which reset and selective reset operations are performed on pixels in the target row to select the integration periods used for each of the pixels that are read out in the target row, in accordance with one embodiment of the present invention.

FIGS. 3 and (4) illustrate time periods 303, (404), 304, (405), and 305 (406) that nest into one row time period in the rolling shutter cadence. It should be understood that the phase of the rolling shutter cadence relative to the placement of these time periods could be changed so that the three time periods noted in each figure would fall into portions of two contiguous row time intervals in the rolling shutter cadence. One skilled in the art may appreciate that with appropriate adjustments to row addresses, such adjustments may result in functionally equivalent operation. Since a description to include these functionally equivalent cases becomes unnecessarily complex, the illustration will be limited to the simpler case with the understanding that the invention also includes the functionally equivalent embodiments where the phase of the rolling shutter cadence is changed relative to the time periods.

Figure 4:
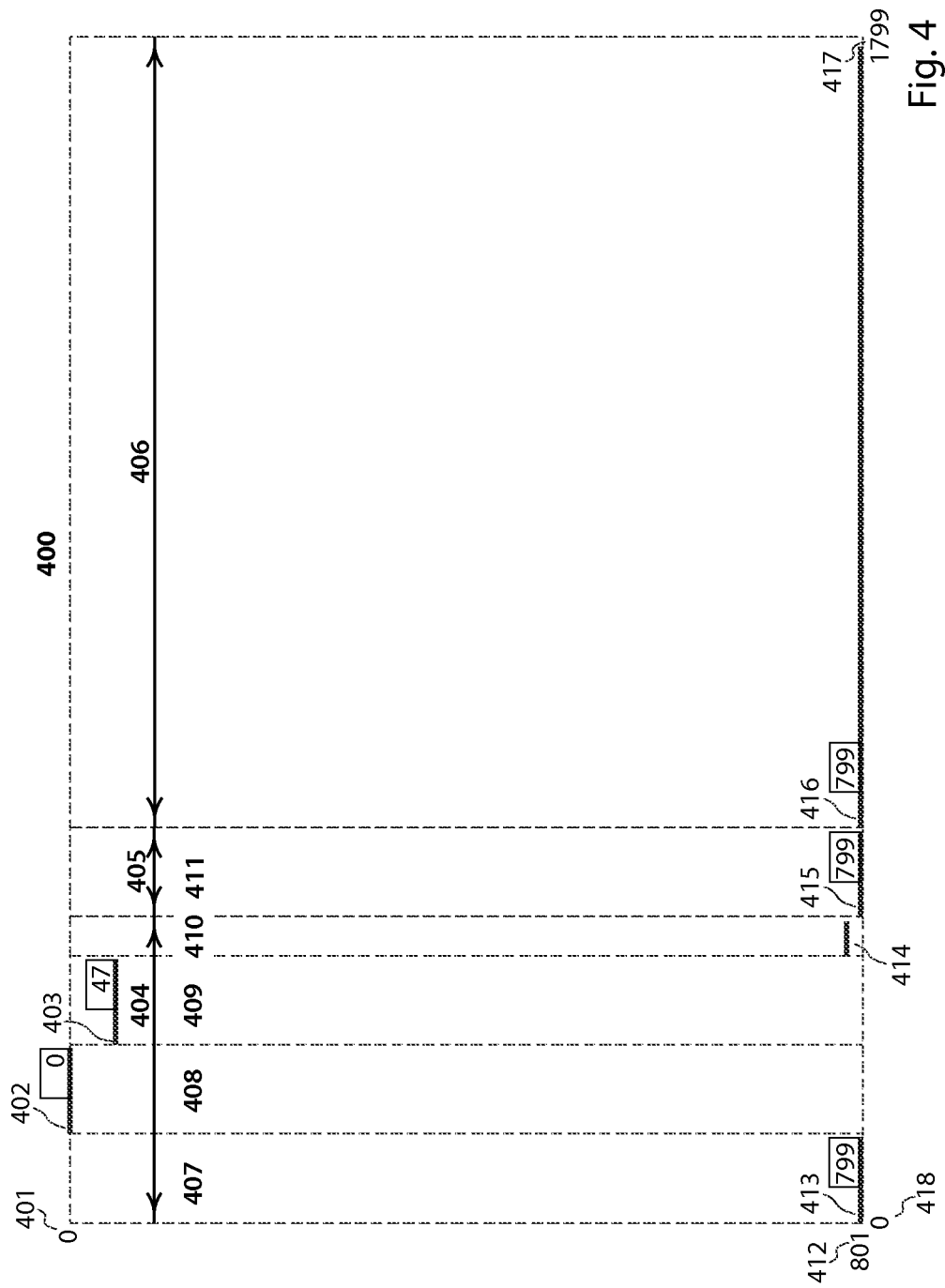
FIG. 4 is a diagram illustrating tasks related to target row, wherein reset and selective reset operations that are performed during the row time interval in the rolling shutter time cadence when the target row is read out to initiate integration periods that is read out mostly in other rows at the climaxes of the new integration periods that are initiated in a task performed during the interval when the target row is read, in accordance with one embodiment of the present invention.

FIGS. 3 and 4 each illustrate an imager having 800 rows (rows 0 through 799) of pixels with 1280 pixels per row. Two additional, blanking, rows are added between frames in the rolling shutter cadence so the rolling shutter cadences progresses from row 0 through row 801 and then back to row 0. Arithmetic on row position is performed using modulo arithmetic so for any result that is below zero, the number of rows in the rolling shutter cadence (802) is added to the result and for any result that is above 801, and the number of rows in the rolling shutter cadence (802) is subtracted from the result. Both FIG. 3 and FIG. 4 illustrate tasks related to target row (row address 799). FIG. 3 and FIG. 4 differ primarily in that FIG. 3 illustrates the locations within the rolling shutter sequence at which reset and selective reset operations are performed on pixels in the target row (row address 799) to select the integration periods used for each of the pixels that are read out in the target row (row address 799) whereas FIG. 4 illustrates reset and selective reset operations that are performed during the row time interval in the rolling shutter time cadence when the target row (row address 799) is read out to initiate integration periods that are read out mostly in other rows at the climaxes of the new integration periods that are initiated in tasks performed during the interval when the target row is read.

The paradigm of FIG. 4 is illustrated by the addition, using modulo arithmetic, of the number of row times in an integration period that is being conditionally initiated to modify the address of the current row that is read out to address the row that is read at the end of the integration period that is being conditionally initiated. This resulting address is used to select the row for application of a task to conditionally initiate the integration period for pixels in the row. This is the paradigm that is applied by the imager control circuit to select rows of pixels for conditional initiation of integration periods.

The integration period or periods that are substantially shorter than one row time are initiated earlier in the target row in which they are read so a row address adjustment of zero from the address of the target row is used. As an option the longest integration period may be initiated by a pixel reset that may be performed as part of the pixel read operation for the previous readout of the row or it may be scheduled as a separate unconditionally performed reset 302 or 414. In FIG. 3 the rows selected for all other resets will be those calculated by subtracting the number of row times, using modulo arithmetic, in the integration period from the address of the target row and in FIG. 4 the row selected for all other resets are those calculated by adding the number of row times, using modular arithmetic, in the integration period to the address of the target row. When a row offset of zero is assigned, no harm is done in calculating the row offset or the calculation which does not change the result may optionally be bypassed. FIG. 4 refers to the rows accessed by the imager during the rolling shutter row time interval where the target row is read out (row address 799) to properly access rows of pixels on which to perform specified integration period initiating tasks so that selectable integration periods of the correct duration are established.

The row address is incremented using modulo arithmetic at the conclusion of each row time interval so that all row addresses, including those of the blanking rows are asserted during the imager frame readout cycle of the rolling shutter sequence since initiation or conditional initiation of various selectable integration periods may still be performed during these row time intervals. Any time a non-active row of pixels such as a blanking row or an otherwise non-active row of pixels is addressed either for readout or for one of the tasks to initiate or conditionally initiate an integration period; the tasks are either inhibited or performed in a way that their execution does not impair imager operation.

FIGS. 3 and 4 provide an example of task scheduling for an imager that uses 4 integration periods with the duration of each integration period nominally ¹⁄₁₆ of the next longer, with the longest integration period of 32768 µs (identifying index 0), the desired next shorter integration period is 2048 µs (identifying index 1) the desired next shorter integration period is 128 µs (identifying index 2), and the desired shortest integration period is 8 µs (identifying index 3). With a frame period of 32768 µs the rolling shutter row time is 40.86 µs (32768 µs/802) providing substantially the full frame period for the longest integration period (identifying index 0) and allowing the reset that may be performed as part of the previous row read of the target row to be used to initiate this period. The desired next shorter integration period (identifying index 1) is 50.12 row times so initiating it at 403, 50 row times before the row at 403 is read, provides 50 row times for the integration period. The added integration time due to the column offset of the conditional reset from the row read is less than 0.12 row times of additional time but the duration of integration period 1 is close to what is desired. The desired next shorter integration period (identifying index 2) is 3.13 row times so initiating it at 402, 3 row times before the row at 402 is read, provides 3 row times of for the integration period. The added integration time due to the column offset of the conditional reset from the row read is a little less than 0.13 row times of additional time so the duration of integration period 1 is reasonably close to what is desired. The desired next shorter and shortest selectable integration period (identifying index 3) is 0.136 row times so placing it at 312 or 413 in the target row restricts the integration period to the fractional row time between the release of the pixel reset to initiate the integration period in 312 or 413 and readout of the value during interval 315, 415. The added integration time due to the column offset of the conditional reset from the row read is made adjustable by provision of the capability to program the position of each of the tasks for conditional initiation of an integration period and also of the task to read the row and also the optional task to begin the longest integration period to provide flexibility to set the shortest integration period with reasonable accuracy and to set the order and relative spacing of the reset tasks within the reset task sequencing interval 303 and 404, and to set the location within the row time of the row read task sequencing interval 304 and 405. The lengths of the reset task interval 303, 404, the row read task sequencing interval and the interval 406 for shared use of the column parallel elements do not need to fill the rolling shutter row time interval but need to be long enough to perform necessary tasks. Shared use of the parallel column circuitry needs to be non-conflicting. This generally requires that the initiation of integration periods may not overlap or fall between the row read and the column parallel analog processing of readout values that makes use of circuits shared by circuits that are shared for analog processing of pixel values during readout and for initiation of integration periods. Furthermore, the selective initiation of the shortest integration period that is less than one half of one row period needs to be placed not only before but at a known time increment before the row read.

In FIGS. 3 and 4, 1800 clock cycles (0 through 1799) are used to partition the row time. The frequency of the sub row timing clock may be selected for convenience and is often related in some way to the number of pixels in a row.

As demonstrated in the example, with some imager configurations, imager integration periods may be set relatively close to desired values to permit satisfactory use of multipliers that are integral powers of 2 to adjust pixel reading for the integration period selected. It is optional to provide fractional adjustment factors based on the selected integration period to provide the final pixel reading. This capability can be provided separately from the imager when needed.

Example features of the imager system may include, but are not limited to, 4 T based pixel structures are used with selection of a shorter integration period based on detection of charge overflow from the pixel light induced charge accumulation site.

Pairs of sampling capacitors are provided for each column to temporarily store and optionally level shift readout and reference values read from pixels in a selected row. These sampling capacitors are shared for use in detection of charge overflow for selective reset operations and for pixel readout.

Column specific correlated double sampling circuits are shared for selective integration period initiation and for pixel readout. The double sampling circuits include automatic offset correction.

Three substantially non-overlapping task initiating time intervals are arranged as interval one, two, and three in that order and used in a repetitious fashion that is synchronized with the rolling shutter cadence. The integration periods for pixels in discretely selected rows are conditionally initiated during the first task initiating time interval. Analog values of a row of pixels designated for readout during the said row processing time interval are sampled for readout during the second task initiating time interval. Digitization of the sampled analog pixel values is initiated during the third task initiating time interval.

Selectable integration periods for pixels in and image frame include ones that span multiple row times and at least one that has an integration period that is substantially less than a row time. For purposes of explanation and not limitation, the integration period can be less than about one-half of a row time, or less than about one-fifth of a row time.

Per column gain stages are provided to amplify pixel values before digitizing the pixel value for each column and, for each column, the amplified value is conditionally selected for A/D readout for the column and an indication of its use or nonuse is included as part of the readout value. The signal can be amplified and a subsequent circuit can conditionally select the amplified or non-amplified signal for increased signal-to-noise ratio. In this way, the settling time of the amplifier may be increased to reduce or prevent extraneous noise. The amplifier circuit can include automatic offset correction.

The per column gain stage is shared for amplification of a charge overflow signal used in conditional initiation of a shorter integration period and as a per column gain stage conditionally selected to amplify the pixel readout value before digitization of this value.

Compare circuits are shared to indicate charge overflow for conditional initiation of a new integration period and to indicate the need to bypass (i.e., not use) a conditionally applied per column gain stage. The compare circuit includes automatic offset correction.

Integration period specific calibration values that indicate the relative durations of the selectable integration periods (or of the relative sensitivity of the pixel to a given light level using the selectable period) is provided and used to calculate the pixel exposure level for a given selectable integration period.

Indications of hardware device-specific per-column gains for the correlated or non-correlated sampling computation circuits are used to compensate for variations in gains of sampling circuits used for individual pixels.

Indications of hardware device-specific per-column gains for the conditionally included column gain stage are used to compensate for individual gains of the gain stage circuits when they are used.

Two or more (may include per column) analog to digital converters are used and an enumeration of values that indicate device specific calibration of the analog to digital converters is provided and used to compensate for the variation in calibration of the individual analog to digital converters that are used.

Inclusion of the use of extended tables to include calibration data to handle any combination of separate items listed in 9, 10, 11 or 12.

According to one embodiment, a high dynamic range imaging system can be configured to capture a high dynamic range image, the imaging system including an image sensor having an array of pixels. The imaging system can also include circuitry that is in electrical communication with each pixel of the array of pixels. The circuitry can include column-parallel signal processing circuits (e.g., column specific signal column parallel signal processing circuits), wherein the column-parallel signal processing circuits are configured to address or sample an analog pixel value of a first pixel of the array of pixels and determine when to selectively initiate a new integration period for the first pixel. Typically, the high dynamic range imaging system is configured to have a 4× gain stage to increase pixel voltage prior to analog-to-digital conversion, which improves the signal to noise ratio.

According to one embodiment, the column-parallel signal processing circuits can be configured to address an analog pixel value of a pixel can include, but is not limited to, sampling, evaluating, making a decision, outputting a control signal, the like, or a combination thereof.

The high dynamic range imaging system described herein can also include selectively initiating a new integration period comprises selectively initiating a shorter integration period.

The high dynamic range imaging system as described herein can also include a column-parallel signal processing circuits that includes a comparator.

The high dynamic range imaging system as described herein, wherein the comparator in the column-parallel processing circuit shares functionality with both circuitry configured for selective reset and circuitry configured for readout sampling.

The high dynamic range imaging system as described herein, wherein the column-parallel signal processing circuits routes signals to one or more analog-to-digital convertors.

The high dynamic range imaging system as described herein, wherein the circuitry is further configured to take one or more analog readings and digitize one of the plurality of analog readings. Typically, the circuitry is configured to take up to about four analog readings and digitize one of the readings.

The high dynamic range imaging system, further including circuitry configured to apply a correction equation to compensate for at least one of offsets, gain differences, ADC differences, sources of error between at least one of pixels, columns, and other circuitry, and sources of differences between at least one of pixels, columns, and other circuitry.

The high dynamic range imaging system as described herein, wherein the circuitry further comprises memory, wherein allocated memory for each pixel includes one or more bits for storing data representative of the selected integration. The high dynamic range imaging system as described herein, wherein the circuitry is further configured to generate one or more bits at readout representative of a conditionally selectable gain. Typically, the one or more bits are not stored in memory, and are utilized to enhance accuracy in an output value.

The high dynamic range imaging system as described herein, wherein the circuitry can achieve greater accuracy by conditionally selecting an appropriate gain amplification prior to digitization, which is used to generate one or more bits of information based on the amount of gain selected.

The high dynamic range imaging system as described herein, wherein the circuitry is configured to perform a conditional reset substantially during a blanking period.

The high dynamic range imaging system as described herein, wherein substantially each pixel of the array of pixels independently selects one of a plurality of available integration periods during a frame period.

The high dynamic range imaging system as described herein, wherein the plurality of available integration periods includes four integration periods, each sequential integration period having approximately a 16:1 ratio.

The high dynamic range imaging system as described herein, wherein the circuitry is further configured to schedule tasks within a row time interval to permit sharing of circuits used for correlated double sampling with selective reset tasks and with pixel readout tasks while also providing at least one selectable integration period for which the integration period is adjustable and set to substantially less than a row time interval.

The high dynamic range imaging system as described herein, wherein a longest integration period of the plurality of available integration periods is more than one row time, and a shortest integration period of the plurality of available integration periods is less than one row time.

The high dynamic range imaging system of as described herein, wherein a shortest integration period of the plurality of available integration periods is less than approximately one-half of a row time.

According to one embodiment, a high dynamic range imaging system can be configured to capture a high dynamic range image, the imaging system including an image sensor having an array of pixels. The high dynamic range imaging system can also include circuitry in electrical communication with each pixel of the array of pixels, wherein the circuitry is configured to independently select one integration period from a set of available integrations periods for substantially each pixel of the array of pixels, wherein the circuitry is further configured to conditionally reset a pixel of the array of pixels when a longest available integration period is not selected, wherein the circuitry is further configured to substantially sequentially readout pixels of the array of pixels, wherein the circuitry is further configured to perform the conditional reset during a blanking period of the readout. Thus, a signal is not to be sampled during digitization, the signal can be sampled during a period when resets will not be active, and said pixels will be digitized while neither sampling nor reset is occurring. Typically, the blanking period is a horizontal blanking period. Alternatively, a vertical blanking period can be used. A time period for horizontal blanking can be increased when compared to a horizontal blanking period where the signal is digitized during row readout.

The high dynamic range imaging system as described herein, wherein the plurality of available integration periods comprises four integration periods, each sequential integration period having a 16:1 ratio.

The high dynamic range imaging system as described herein, wherein a longest integration period of said plurality of available integration periods comprises multiple row times, and a shortest integration period of the plurality of available integration periods is less than one row time.

The high dynamic range imaging system as described herein, wherein a shortest integration period of the plurality of available integration periods is approximately one-fifth of a row time.

The high dynamic range imaging system as described herein, wherein the circuitry comprises column-parallel signal processing circuits, the column-parallel signal processing circuits being configured to sample an analog pixel value of a first pixel of the array of pixels and determine when to selectively initiate a new integration period for the first pixel.

An imaging system configured to capture an image, the imaging system including a high dynamic range imager configured to capture at least one high dynamic range image, the high dynamic range imager comprising circuitry, and a processing device communicatively connected to said high dynamic range imager, wherein scheduling tasks within a row time interval is arranged to permit sharing of circuits used for correlated double sampling with selective reset tasks and with pixel readout tasks while also providing at least one selectable integration period for which the integration period is adjustable and set to substantially less than a row time interval.

According to one embodiment, circuitry can be analog circuitry, a processor/digital circuitry (e.g., serial processor, FPGA, etc.), or a combination thereof. Additional or alternatively, the circuitry can be on an imager chip, remote from an imager chip, or a combination thereof.

It will be appreciated that embodiments of the invention described herein may be comprised of one or more conventional processors and unique stored program instructions that control one or more processors to implement, in conjunction with certain non-processor circuits, some, most, or all of the functions of a high dynamic range imager system, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The above description is considered that of preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A high dynamic range imaging system configured to capture a high dynamic range image, the imaging system comprising:
   an image sensor comprising:

an array of pixels; and circuitry in electrical communication with each pixel of said array of pixels;

wherein said circuitry is configured to independently select one integration period from a set of available integration periods for substantially each pixel of said array of pixels, wherein said circuitry is further configured to conditionally reset a pixel of said array of pixels when a longest available integration period is not selected, wherein said circuitry is further configured to substantially sequentially readout pixels of said array of pixels, wherein said circuitry is further configured to perform said conditional reset during a blanking period of said readout.

2. The high dynamic range imaging system of claim 1, wherein said circuitry is further configured to schedule tasks within a row time interval to permit sharing of circuits used for correlated double sampling with selective reset tasks and with pixel readout tasks while also providing at least one selectable integration period for which the integration period is adjustable and set to substantially less than the row time interval.

3. The high dynamic range imaging system of claim 1, wherein a longest integration period of said plurality of available integration periods is greater than a plurality of row times, and a shortest integration period of said plurality of available integration periods is less than one row time.

4. The high dynamic range imaging system of claim 1, wherein said circuitry comprises a column-parallel signal processing circuit, said column-parallel signal processing circuit being configured to address an analog pixel value of a pixel of said array of pixels and determine when to selectively initiate a new integration period for said pixel.

5. The high dynamic range imaging system of claim 4, wherein selectively initiating a new integration period comprises selectively initiating a shorter integration period.

6. The high dynamic range imaging system of claim 4, wherein said column-parallel signal processing circuit comprises a comparator, said comparator configured to share functionality with both circuitry configured for selective reset and circuitry configured for readout sampling.

7. An imaging system configured to capture an image, the imaging system comprising:

a high dynamic range imager configured to capture at least one high dynamic range image, said high dynamic range imager comprising circuitry; and circuitry configured to schedule tasks within a row time interval to permit sharing of circuits used for correlated double sampling between selective reset tasks and pixel readout tasks while also providing at least one selectable integration period for which the integration period is adjustable and set to substantially less than the row time interval.

8. The imaging system of claim 7, wherein a first selectable integration period of the at least one selectable integration period is longer than a second integration period.

9. The imaging system of claim 7, wherein the circuitry is further configured to control an intermediate voltage corresponding to a conduction threshold to select the at least one selectable integration period.

10. The imaging system according to claim 9, wherein the circuitry is further configured to detect a signal in a floating diffusion to select the at least one selectable integration period in response to a charge level exceeding the conduction threshold.

* * * * *